(No Model.)

G. W. PROUTY.
MECHANICAL MOVEMENT.

No. 245,013. Patented Aug. 2, 1881.

Witnesses:
Chas. E. Hancock.
Walter E. Lombard

Inventor:
George W. Prouty
by N. C. Lombard
Attorney.

N. PETERS, Photo-Lithographer, Washington, D. C.

UNITED STATES PATENT OFFICE.

GEORGE W. PROUTY, OF BOSTON, MASSACHUSETTS, ASSIGNOR TO THE PROUTY PRESS COMPANY, OF HARTFORD, CONNECTICUT.

MECHANICAL MOVEMENT.

SPECIFICATION forming part of Letters Patent No. 245,013, dated August 2, 1881.

Application filed June 4, 1881. (No model.)

*To all whom it may concern:*

Be it known that I, GEORGE W. PROUTY, of Boston, in the county of Suffolk and State of Massachusetts, have invented a new and useful Mechanical Movement, of which the following, taken in connection with the accompanying drawings, is a specification.

My invention relates to a new and useful mechanical movement, its object being to produce an intermittent vibratory motion with a period of rest after each vibration; and it consists in the combination of a segment of a gear provided with an anti-friction roll, a second or driving segment provided with teeth to engage with the teeth of the first segment and a wedge or cam surface which engages with the anti-friction roll on said first segment, and means of imparting to the driving-segment a regular and continuous vibratory motion, all so arranged that the driving-segment shall move through a greater arc than the first-mentioned segment, the wedge or cam surface of said driving-segment acting upon the anti-friction roll of the first segment to hold said segment stationary, or substantially so, after the disengagement of the teeth of the segments until said teeth are brought into re-engagement by the reverse motion of the driving-segment.

Figure 2:
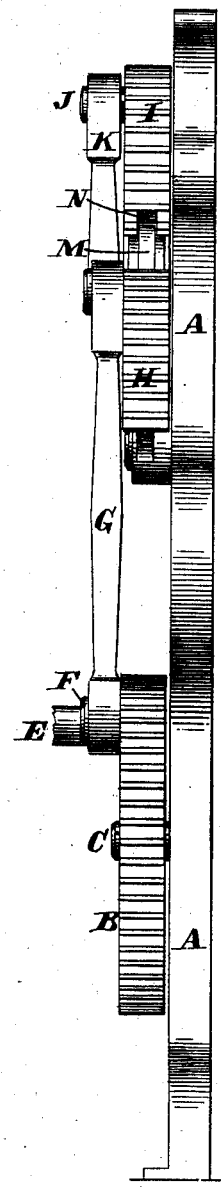
Figure 1:
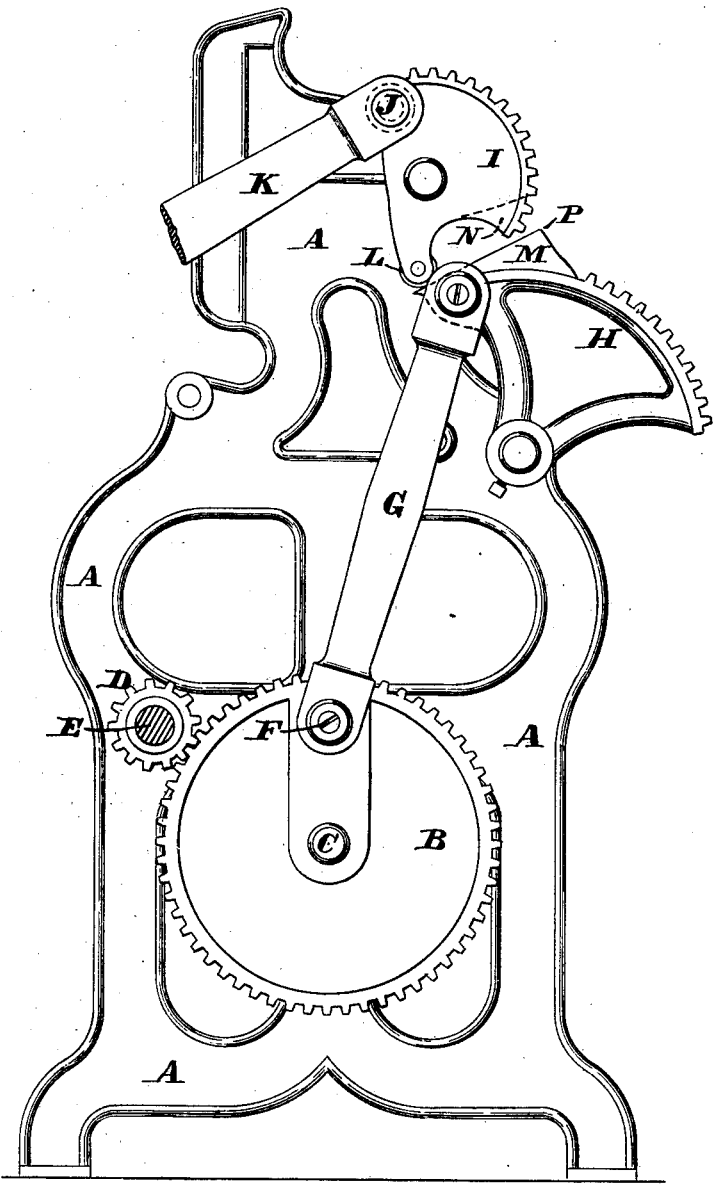

In the drawings, Figure 1 is a side elevation of mechanism illustrating my present invention, and Fig. 2 is an edge view of the same.

A is a frame, upon which are mounted the various parts of the mechanism.

B is a spur-gear wheel mounted upon the journal C, said gear-wheel being driven by the spur-pinion D, mounted upon the driving-shaft E, to which rotary motion may be imparted by a suitable pulley or crank. (Not shown in the drawings.)

To a crank-pin, F, set in the gear-wheel B, is connected one end of the pitman G, the opposite end of which is connected to the toothed segment H, and imparts a vibratory motion thereto, caused by the revolution of the gear-wheel B. The segment H imparts a similar vibratory motion to the segment I by the teeth of said segments coming into contact at the proper times, as will be more fully described.

In the segment I is fixed a wrist-pin, J, to which is connected one end of the rod or draw-bar K, which serves to impart the desired motion to the object to be moved.

In a suitable slotted projection of the segment I is mounted an anti-friction roll, L, which comes in contact at the proper times and bears upon the cam-surface or edge of the wedge-like projection M, formed on the segment H, a slot, N, being cut through the edge of the segment I, as shown in Fig. 2 and indicated by dotted lines in Fig. 1, to prevent the projection M from interfering with the proper movement of the segment I. The two segments H and I are arranged to move together during a portion of the time or while the teeth of said segments are in contact; but as they move about their axes and approach the position shown in the drawings the teeth of the segments disengage, and at the same time the anti-friction roll L on the segment I comes into contact with the cam-surface on the projection M of the segment H, said cam-surface being so shaped that the segment I shall be gradually brought to a standstill and remain so during the continued movement of the segment H in the same direction or until after said segment has begun its reverse motion. As the segment H moves in the reverse direction the projection M, acting gradually upon the roll L, imparts motion to the segment I, and when the roll L reaches the point P on the projection M the teeth of the segments re-engage and move together during the remainder of the motion in that direction. As the roll L, during its movement in contact with the projection M, approaches the point P of said projection the motion of the segment I is gradually accelerated, so that by the time the roll L has reached the point P said segment will be moving with a speed equal to that at which it moves when the teeth of the two segments are in contact, thus allowing said teeth to engage without shock or jarring of the parts, and the cam-surface on the projection M should be so shaped as to gradually arrest the motion of the segment I, and as gradually start it in the reverse direction, thus causing the parts to work with perfect smoothness.

My invention is useful as applied to various machines when it is desired to produce an intermittent vibratory or reciprocating motion with a "dwell" or "standstill" after each complete vibration or reciprocation, the segment I being suitably connected to the part or parts to which the desired motion is to be imparted.

The positions and proportions of the parts may be modified according to circumstances without affecting the principle of my invention—as, for instance, the pitman G may be connected to either end of the segment H, and the gear-wheel B, instead of being placed below the segment H, as shown in the drawings, may be placed above or at either side thereof, or the proportionate sizes of the segments may be varied.

Instead of operating the segment H by the continuous rotary motion of the crank-pin F through the medium of the pitman G, it may be operated by any suitable mechanism which will impart to it a regular and continuous vibratory motion—as, for instance, it may be connected to something having a continuous rectilinear reciprocating motion, like the piston-rod of a steam-engine.

What I claim as new, and desire to secure by Letters Patent of the United States, is—

As a means of producing an intermittent vibratory motion with a period of rest after each vibration, the segment H, adapted to have imparted thereto a regular and continuous vibratory motion and provided with the wedge or cam-shaped projection M, in combination with the segment I, provided with the anti-friction roll L, all arranged and adapted to operate substantially as described.

Executed at Boston, Massachusetts, this 28th day of May, A. D. 1881.

GEORGE W. PROUTY.

Witnesses:
    E. A. HEMMENWAY,
    WALTER E. LOMBARD.